United States Patent
Balnis

(10) Patent No.: US 10,882,978 B2
(45) Date of Patent: Jan. 5, 2021

(54) TIRE WITH COMPONENT COMPRISING CURED RUBBER COMPOSITION HAVING HIGH DIELECTRIC CONSTANT AND RELATED METHODS

(71) Applicant: Bridgestone Americas Tire Operations, LLC, Nashville, TN (US)

(72) Inventor: Craig R. Balnis, Aberdeen, NC (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 29 days.

(21) Appl. No.: 16/098,273

(22) PCT Filed: Apr. 26, 2017

(86) PCT No.: PCT/US2017/029662
§ 371 (c)(1),
(2) Date: Nov. 1, 2018

(87) PCT Pub. No.: WO2017/192337
PCT Pub. Date: Nov. 9, 2017

(65) Prior Publication Data
US 2019/0144639 A1    May 16, 2019

Related U.S. Application Data

(60) Provisional application No. 62/330,639, filed on May 2, 2016.

(51) Int. Cl.
| | |
|---|---|
| *C08L 7/00* | (2006.01) |
| *B60C 1/00* | (2006.01) |
| *C08K 3/04* | (2006.01) |
| *C08K 3/06* | (2006.01) |
| *C08K 7/16* | (2006.01) |
| *C08K 5/36* | (2006.01) |
| *C08K 9/06* | (2006.01) |
| *C08K 3/011* | (2018.01) |

(52) U.S. Cl.
CPC ............ *C08L 7/00* (2013.01); *B60C 1/00* (2013.01); *C08K 3/011* (2018.01); *C08K 3/04* (2013.01); *C08K 3/06* (2013.01); *C08K 5/36* (2013.01); *C08K 7/16* (2013.01); *C08K 9/06* (2013.01); *B60C 2001/0058* (2013.01); *C08L 2205/06* (2013.01); *C08L 2312/00* (2013.01)

(58) Field of Classification Search
CPC ............ C08L 7/00; B60C 1/00; C08K 3/04
USPC ..................................... 524/575.5
See application file for complete search history.

(56) References Cited

U.S. PATENT DOCUMENTS

| | | | |
|---|---|---|---|
| 5,610,240 A | 3/1997 | Hogt et al. | |
| 5,660,656 A | 8/1997 | Herbelleauu et al. | |
| 5,981,637 A | 11/1999 | Blok et al. | |
| 6,103,811 A | 8/2000 | Midorikawa et al. | |
| 6,809,137 B2 | 10/2004 | Matsuo et al. | |
| 9,023,928 B2 | 5/2015 | Miyazaki et al. | |
| 9,061,548 B2 | 6/2015 | Miyazaki | |
| 9,127,145 B2 | 9/2015 | Tanabe | |
| 2003/0015271 A1 | 1/2003 | Meza et al. | |
| 2003/0141000 A1 | 7/2003 | Serra et al. | |
| 2008/0095696 A1 | 4/2008 | Matsushima | |
| 2009/0015415 A1* | 1/2009 | Uehara | G06K 19/07749 340/572.8 |
| 2012/0168051 A1 | 7/2012 | Matsuo et al. | |
| 2014/0000791 A1 | 1/2014 | Cereda et al. | |
| 2014/0333492 A1 | 11/2014 | Battocchio | |
| 2015/0031821 A1 | 1/2015 | Shiono et al. | |
| 2015/0266344 A1 | 9/2015 | Giannini et al. | |
| 2015/0291782 A1 | 10/2015 | Feldhues et al. | |
| 2015/0314645 A1 | 11/2015 | Tanabe | |
| 2016/0001601 A1 | 1/2016 | Oyama | |

FOREIGN PATENT DOCUMENTS

| | | |
|---|---|---|
| CN | 102634076 A | 8/2012 |
| JP | S57-47025 B2 | 10/1982 |
| JP | 2009286327 A | 12/2009 |
| JP | 2010163593 A | 7/2010 |
| JP | 2013006896 A | 1/2013 |
| JP | 2015089784 A | 5/2015 |
| WO | 2009039889 A1 | 4/2009 |
| WO | 2013079854 A1 | 6/2013 |

OTHER PUBLICATIONS

Kim, Sun Hee, International Search Report with Written Opinion from PCT/US2017/029662, 16 pp. (dated Jul. 28, 2017).
Extended European Search Report and Search Opinion from European application No. 17793025, dated Nov. 15, 2019.

* cited by examiner

*Primary Examiner* — Deve V Hall
(74) *Attorney, Agent, or Firm* — Meredith E. Hooker; Jenny L. Sheaffer

(57) ABSTRACT

Disclosed herein are tires with a component comprising a cured rubber composition having a high dielectric constant, tire bead fillers comprising a cured rubber composition having a high dielectric constant, and related methods for increasing the dielectric constant of a cured rubber composition for a tire component. According to certain embodiments, the cured rubber composition has a dielectric constant of at least 20 and comprises 100 phr of at least one conjugated diene monomer-containing elastomer, filler comprising at least 25 phr of reinforcing carbon black, a cure package of specified composition, and optionally at least one anti-reversion agent.

20 Claims, No Drawings

TIRE WITH COMPONENT COMPRISING CURED RUBBER COMPOSITION HAVING HIGH DIELECTRIC CONSTANT AND RELATED METHODS

FIELD

The present application is directed to a tire with a component comprising a cured rubber composition having a high dielectric constant, tire bead fillers comprising a cured rubber composition having a high dielectric constant, and related methods for increasing the dielectric constant of a cured rubber composition for a tire component.

BACKGROUND

The dielectric constant exhibited by the cured rubber compositions of various tire components takes on increasing importance when an electronic communication module (such as can be used to identify and/or monitor the tire) is incorporated into the tire. The various components of commercially available tires (e.g., sidewall, tread, nylon-containing skim ply, and bead filler) are comprised of cured rubber compositions generally having a dielectric constant no higher than about 13. Formulation of rubber compositions for use in tires in connection with electric communication modules has been primarily focused upon reducing the dielectric constant of a rubber composition used to coat the electronic communication module in an effort to improve the readability of a radio device of the electronic communication module.

SUMMARY

Disclosed herein are tires with a component comprising a cured rubber composition having a high dielectric constant, tire bead fillers comprising a cured rubber composition having a high dielectric constant, and related methods for increasing the dielectric constant of a cured rubber composition for a tire component.

In a first embodiment, a tire containing at least one component comprised of a cured rubber composition of specified composition is disclosed. The rubber composition comprises: (a) 100 phr of at least one conjugated diene monomer-containing elastomer; (b) filler comprising at least 25 phr of reinforcing carbon black; (c) a cure package comprising: (i) at least 10 phr of vulcanizing agent, and (ii) at least one vulcanizing accelerator; and (d) optionally at least one anti-reversion agent. Moreover, the cured rubber composition has a dielectric constant of at least 20.

In a second embodiment, a method for increasing the dielectric constant of a cured rubber composition tire component is disclosed. The method comprising providing a rubber composition having an increased crosslink density (as compared to a control composition) and a dielectric constant of at least 20.

In a third embodiment, a tire containing a bead filler comprising a cured rubber composition having an increased crosslink density (as compared to a control composition) and a dielectric constant of at least 20 is disclosed.

DETAILED DESCRIPTION

Disclosed herein are tires with a component comprising a cured rubber composition having a high dielectric constant, tire bead fillers comprising a cured rubber composition having a high dielectric constant, and related methods for increasing the dielectric constant of a cured rubber composition for a tire component.

In a first embodiment, a tire containing at least one component comprised of a cured rubber composition of specified composition is disclosed. The rubber composition comprises: (a) 100 phr of at least one conjugated diene monomer-containing elastomer; (b) filler comprising at least 25 phr of reinforcing carbon black; (c) a cure package comprising: (i) at least 10 phr of vulcanizing agent, and (ii) at least one vulcanizing accelerator; and (d) optionally at least one anti-reversion agent. Moreover, the cured rubber composition has a dielectric constant of at least 20.

In a second embodiment, a method for increasing the dielectric constant of a cured rubber composition tire component is disclosed. The method comprising providing a rubber composition having an increased crosslink density (as compared to a control composition) and a dielectric constant of at least 20.

In a third embodiment, a tire containing a bead filler comprising a cured rubber composition having an increased crosslink density (as compared to a control composition) and a dielectric constant of at least 20 is disclosed.

Definitions

The terminology as set forth herein is for description of the embodiments only and should not be construed as limiting the invention as a whole.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, "nitrogen surface area" refers to the nitrogen absorption specific surface area ($N_2SA$) of a particulate material, including but not limited to the carbon black and "non-reinforcing fillers" of particulate material discussed herein. The nitrogen surface area can be determined by various standard methods including those mentioned below.

As used herein, the term "phr" means parts per one hundred parts rubber. In certain embodiments, the 100 parts rubber should be understood to refer to 100 parts of the at least one diene based elastomer. 100 parts of rubber may also be referred to as 100 phr.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the terms "relative permittivity" and "dielectric constant" of a material are intended to have the same meaning and are used interchangeably to refer to the ratio of the dielectric permittivity of a material to the permittivity of a vacuum (with permittivity being determined at 915 MHz in units of farads/meter). Unless otherwise indicated, the dielectric constant values disclosed herein refer to those of a cured form of the rubber composition.

Tires

As discussed above, the first embodiment disclosed herein is directed to a tire containing at least one component comprised of a cured rubber composition. The cured rubber composition of the tire component comprises: (a) 100 phr of at least one conjugated diene monomer-containing elastomer; (b) filler comprising at least 25 phr of reinforcing carbon black; (c) a cure package comprising: (i) at least 10 phr of vulcanizing agent, and (ii) at least one vulcanizing accelerator; and (d) optionally at least one anti-reversion agent. Moreover, the cured rubber composition has a dielectric constant of at least 20. As also discussed above, the third embodiment disclosed herein is directed to a tire containing a bead filler comprising a cured rubber composition having an increased crosslink density (as compared to a control composition) and a dielectric constant of at least 20. In certain embodiments of the first and second embodiments, the tire comprises a pneumatic tire.

Cured Rubber Composition

As discussed above, according to the first embodiment, a tire containing at least one component comprised of a cured rubber composition is provided and according to the second embodiment, a tire containing a bead filler comprised of a cured rubber composition is provided. As also discussed above, according to the second embodiment, a method for increasing the dielectric constant of a cured rubber composition is provided. Thus, each of the first-third embodiments include a cured rubber composition. The components (or ingredients) of the cured rubber compositions according to the first-third embodiments are discussed below. Although the discussion refers to the amount contained with the cured rubber compositions, it should be understood that corresponding amounts can be used to prepare (or in a process of preparing such cured rubber compositions) and those corresponding amounts should be considered to be fully disclosed.

Conjugated Diene Monomer-Containing Elastomer

According to the first embodiment, the cured rubber composition comprises 100 phr of at least one conjugated diene monomer-containing elastomer. In certain embodiments of the second and third embodiments, the cured rubber composition comprises 100 phr of at least one conjugated diene monomer-containing elastomer. According to the first-third embodiments, the cured rubber composition may comprise one or more than one (e.g., two, three, or more) conjugated diene monomer-containing elastomers. By stating that 100 phr of at least one conjugated diene monomer-containing elastomer is present is meant that the total amount of all such elastomers is 100 parts (or 100 phr). The at least one conjugated diene monomer-containing elastomer should be understood as a polymer comprising at least one conjugated diene monomer, optionally in combination with at least one vinyl aromatic monomer (thereby resulting in a copolymer).

As those of skill in the art will understand, a conjugated diene monomer is a compound that has two double carbon-carbon bonds (i.e., two —C=C— bonds) that are separated by a single bond (i.e., —C—C—); a conjugated diene will contain at least one —C=C—C=C— moiety. The particular structure of the conjugated diene monomer used to prepare the at least one conjugated diene monomer-containing elastomer of the first-third embodiments disclosed herein can vary. Non-limiting examples of suitable conjugated diene monomers according to certain embodiments of the first-third embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diener may be utilized in certain embodiments of the first-third embodiments. In certain embodiments of the first-third embodiments, the conjugated diene monomer comprises 1,3-butadiene, isoprene, or a combination thereof. In certain embodiments of the first-third embodiments, the conjugated diene monomer comprises 1,3-butadiene.

As mentioned above, the at least one conjugated diene monomer-containing elastomer may be a copolymer comprising at least one conjugated diene monomer in combination with at least one vinyl aromatic monomer. In certain embodiments of the first-third embodiments disclosed herein, the at least one vinyl aromatic monomer comprises at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-third embodiments disclosed herein, the at least one vinyl aromatic monomer comprises styrene. In certain embodiments of the first-third embodiments disclosed herein, the at least one conjugated diene monomer comprises 1,3-butadiene and the at least one vinyl aromatic monomer comprises styrene.

In certain embodiments of the first-third embodiments disclosed herein, the at least one conjugated diene monomer-containing elastomer comprises at least one of the following rubbers: polyisoprene rubber, natural rubber, styrene-butadiene rubber, styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, and ethylene-propylene-diene rubber (EPDM). In certain embodiments of the first-third embodiments disclosed herein, the at least one conjugated diene monomer-containing elastomer comprises at least one of: styrene-butadiene rubber, polybutadiene, styrene-isoprene rubber, styrene-butadiene-isoprene rubber, natural rubber, or polyisoprene. In certain embodiments of the first-third embodiments, the at least one conjugated diene elastomer comprises at least one of: styrene-butadiene rubber, polybutadiene, natural rubber, or polyisoprene. In certain embodiments of the first-third embodiments, any polybutadiene utilized is preferably a high-cis polybutadiene, having a cis 1,4-bond content of at least 85%, even more preferably at least 90%, or even at least 95% or at least 98%.

In certain embodiments of the first-third embodiments, the cured rubber composition comprises at least 51 phr (e.g., 51 phr, 55 phr, 60 phr, 65 phr, 70 phr, 75 phr, 80 phr, 85 phr, 90 phr, 95 phr or 100 phr) natural rubber, polyisoprene, or a combination thereof. In certain embodiments of the first-third embodiments, the cured rubber composition comprises 51-100 phr, 60-100 phr, 70-100 phr, 80-100 phr, 90-100 phr, 51-90 phr, 60-90 phr, 70-90 phr, 80-90 phr natural rubber, polyisoprene, or a combination thereof. In certain embodiments of the first-third embodiments, the cured rubber composition comprises at least 51 phr (e.g., 51 phr, 55 phr, 60 phr, 65 phr, 70 phr, 75 phr, 80 phr, 85 phr, 90 phr, 95 phr or 100 phr) natural rubber. In certain embodiments of the first-third embodiments, the cured rubber composition comprises 51-100 phr, 60-100 phr, 70-100 phr, 80-100 phr, 90-100 phr, 51-90 phr, 60-90 phr, 70-90 phr, 80-90 phr natural rubber.

Other Rubbers

In certain embodiments of the fourth embodiment, the cured rubber composition comprises in addition to or in substitution for the rubbers discussed above (i.e., conjugated diene monomer-containing elastomer rubbers), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, tetrafluoroethylene-propylene rubber, and combinations thereof. Examples of fluorinated rubber include perfluoroelastomer rubber, fluoroelastomer, fluorosilicone, tetrafluoroethylene-propylene rubber, and combinations thereof.

Filler Ingredients

Carbon Black

As discussed above, according to the first embodiment, the cured rubber composition comprises at least 25 phr of reinforcing carbon black. In certain embodiments of the second and third embodiments, the cured rubber composition comprises at least 25 phr of reinforcing carbon black. According to the first-third embodiments, one or more than one reinforcing carbon black may be utilized in the cured rubber composition. In certain embodiments of the first-third embodiments, the cured rubber composition comprises 25-200 phr (e.g., 25 phr, 35 phr, 45 phr, 50 phr, 55 phr, 65 phr, 75 phr, 85 phr, 95 phr, 100 phr, 110 phr 120 phr, 130 phr, 140 phr, 150 phr, 160 phr, 170 phr, 180 phr, 190 phr, or 200 phr), 25-150 phr, 25-100 phr, 35-200 phr, 35-150 phr, 35-100 phr, 50-200 phr, 50-150 phr, 50-100 phr, 75-200 phr, 75-150 phr or 75-100 phr of at least one reinforcing carbon black. In certain embodiments of the first-third embodiments, the cured rubber composition also includes (further comprises) at least one non-reinforcing carbon black. The term "reinforcing filler" is used herein to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments, the term "reinforcing filler" is alternatively or additionally used to refer to a particulate material that has a particle size of about 10 nm up to about 1000 nm, including 10 nm up to 1000 nm, about 10 nm up to about 50 nm, and 10 nm up to 50 nm.

Most (but not all) carbon blacks are reinforcing fillers. In certain embodiments of the first-third embodiments, the cured rubber composition comprises a total amount of reinforcing carbon black and any other reinforcing filler (e.g., silica filler) of 25 to 200 phr (e.g., 25 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr or 200 phr). In certain embodiments of the first-third embodiments, reinforcing carbon black is present in the cured rubber composition in an amount of at least 25 phr and also comprises at least 50% by weight of the total reinforcing filler present in the cured rubber composition, including 50-100% (e.g., 50%, 55%, 60%, 65%, 70%, 75%, 80%, 85%, 90%, 95% or 100%), 50-90%, 50-80%, 50-70%, 60-100%, 60-90%, or 60-80% by weight of the total reinforcing filler. In certain preferred embodiments of the first-third embodiments, the cured rubber composition comprises reinforcing filler comprising at least 80 weight %, at least 90 weight %, at least 95 weight % or even 100 weight % of one or more reinforcing carbon blacks. Generally, suitable reinforcing carbon black for use in the cured rubber compositions of certain embodiments of the first-third embodiments includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments disclosed herein, the cured rubber composition includes a mixture of two or more of the foregoing blacks. Typical suitable reinforcing carbon blacks for use in the rubber compositions of certain embodiments of the first-third embodiments include N-110, N-220, N-339, N-330, N-351, N-550, N-660, and combinations thereof, as designated by ASTM D-1765-82a. The carbon blacks utilized can be in pelletized form or an unpelletized flocculent mass. Preferably, for more uniform mixing, unpelletized carbon black is preferred.

Non-reinforcing carbon black fillers can optionally be included as a filler in the cured rubber compositions of certain embodiments of the first-third embodiments; in certain such embodiments, the amount of non-reinforcing carbon black filler is at least 10 phr, at least 20 phr, 10-100 phr, 20-100 phr, 10-90 phr, 20-90 phr, 10-80 phr, 20-80 phr, 10-70 phr, 20-70 phr, 10-60 phr, 20-60 phr, 10-50 phr, or 20-50 phr. Non-limiting examples of non-reinforcing carbon blacks for use as a filler in certain embodiments of the first-third embodiments disclosed herein include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

Silica

In certain embodiments of the first-third embodiments, the cured rubber composition includes (further comprises) at least one silica filler. In those embodiments of the first-third embodiments wherein silica filler is included in the cured rubber composition, the amount of silica filler utilized may vary. Exemplary amounts of silica filler in combination with carbon black (e.g., total amounts of reinforcing fillers) are discussed above. In certain embodiments of the first-third embodiments, the cured rubber composition comprises 5 to 100 phr (e.g., 5, 10, 20, 30, 40, 50, 60, 70, 80, 90, or 100 phr), 5 to 80 phr, 5 to 60 phr, or 5 to 50 phr of at least one silica filler. In certain preferred embodiments of the first-third embodiments, the cured rubber composition comprises no more than 40 phr of silica filler, no more than 30 phr of silica filler, no more than 20 phr of silica filler, no more than 10 phr of silica filler, no more than 5 phr of silica filler, or 0 phr of silica filler.

Suitable silica fillers for use in the cured rubber compositions of the first-third embodiments disclosed herein are well known. Non-limiting examples of silica fillers suitable for use in certain embodiments of the first-third embodiments disclosed herein include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of first-third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different silica fillers. In certain embodiments of the first-third embodiments disclosed herein, the cured rubber composition comprises a silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the first-third embodiments disclosed herein, the cured rubber composition comprises silica filler having a pH of about 5.5 to about 7 or slightly over 7, preferably about 5.5 to about 6.8. Some of the commercially available silica fillers which can be used in the cured rubber compositions of certain embodiments of the first-third embodiment disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different silica fillers are also available from Degussa Corporation (e.g., VN2, VN3), Rhone Poulenc (e.g., Zeosil™ 1165 MP), and J. M. Huber Corporation.

In certain embodiments of the first-third embodiments disclosed herein, the silica filler comprises a silica that has been pre-reacted with a silica coupling agent; preferably the pre-treated silica comprises a silica that has been pre-treated with a silane-containing silica coupling agent.

Silica Coupling Agents

In certain embodiments of the first-third embodiments disclosed herein, particularly those where at least one silica filler is present, one or more silica coupling agents is utilized in the cured rubber composition. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processibility and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in cured rubber compositions of certain embodiments of the first-third embodiments include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the first-third embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula $HS—R^3—Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B—S—R^6—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the first-third embodiments disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the first-third embodiments disclosed herein include bis(trialkoxysilylorgano) disulfides and bis(trialkoxysilylorgano) tetrasulfides. Specific non-limiting examples of bis(trialkoxysilylorgano)disulfides suitable for use in certain exemplary embodiments of the first-third embodiments disclosed herein include, but are not limited to, 3,3'-bis(triethoxysilylpropyl) disulfide, 3,3'-bis(trimethoxysilylpropyl)disulfide, 3,3T-bis(tributoxysilylpropyl)disulfide, 3,3'-bis(tri-t-butoxysilylpropyl)disulfide, 3,3'-bis(trihexoxysilylpropyl) disulfide, 2,2'-bis(dimethylmethoxysilylethyl)disulfide, 3,3'-bis(diphenylcyclohexoxysilylpropyl)disulfide, 3,3'-bis (ethyl-di-sec-butoxysilylpropyl)disulfide, 3,3'-bis (propyldiethoxysilylpropyl)disulfide, 12,12'-bis (triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in certain embodiments of the first-third embodiments disclosed herein include, but are not limited to, bis(3-triethoxysilylpropyl) tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of the first-third embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiment of the first-third embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilyl methyl methylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the first-third embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, Coupsil® 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., 5 to 175 phr, etc.).

When a silica coupling agent is utilized in a cured rubber composition according to the first-third embodiments disclosed herein, the amount used may vary. In certain embodiments of the first-third embodiments disclosed herein, the cured rubber compositions do not contain any silica coupling agent. In other embodiments of the first-third embodiments disclosed herein, the silica coupling agent is present in an amount sufficient to provide a ratio of the total amount of silica coupling agent to silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the first-third embodiments disclosed herein, the cured rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Other Fillers

In certain embodiments of the first-third embodiments, the cured rubber composition includes (further comprises) at least one filler other than carbon black and silica or in addition to carbon black and silica. Non-limiting examples of suitable additional reinforcing fillers for use in certain embodiments of the first-third embodiments disclosed herein include, but are not limited to, alumina, aluminum hydroxide, clay, magnesium hydroxide, boron nitride, aluminum nitride, titanium dioxide, reinforcing zinc oxide, and combinations thereof. In certain embodiments of the first-third embodiments, at least one inorganic filler (either in addition to the optional silica filler or instead of any silica filler) is included in the cured rubber composition. Suitable inorganic fillers for use in certain embodiments of the first-third embodiments disclosed herein are not particularly limited and non-limiting examples include: aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_34\ SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

Cure Package

As discussed above, according to the first and third embodiments, the cured rubber composition comprises a cure package comprising at least 10 phr of vulcanizing agent and at least one vulcanizing accelerator. Moreover, in certain embodiments of the second embodiment the cured rubber composition comprises a cure package; in certain such embodiments the cure package comprises at least 10 phr of vulcanizing agent and at least one vulcanizing accelerator. In certain embodiments of the first-third embodiments, the cure package of the rubber composition includes (further comprises) at least one vulcanization activator (e.g., zinc oxide, stearic acid, and the like) and optionally at least one vulcanization inhibitor.

In certain embodiments of the first-third embodiments, the rubber composition comprises at least one vulcanizing agent in an amount sufficient to provide a ratio of vulcanizing agent to vulcanizing accelerator of greater than 4:1. As a non-limiting example, a rubber composition comprising 1.0 phr of CBS vulcanizing accelerator, 0.2 phr of MBTS vulcanizing accelerator and 12 phr of sulfur as vulcanizing agent would have a ratio of vulcanizing agent to vulcanizing accelerator of 10:1. In certain embodiments of the first-third embodiments, this ratio is at least 5:1, at least 6:1, at least 7:1, at least 8:1, at least 9:1, at least 10:1, at least 11:1, at least 12:1, at least 13:1, at least 15:1 or higher. In certain embodiments of the first-third embodiments, this ratio is no greater than 20:1, no greater than 19:1, no greater than 18:1, no greater than 17:1, no greater than 16:1, or no greater than 15:1. In certain embodiments of the first-third embodiments, the ratio of vulcanizing agent to vulcanizing accelerator is greater than 4:1 (e.g., 4.1:1, 4.2:1, 4.3:1, 4.4:1, 4.5:1, 4.6:1, 4.7:1, 4.8:1, 4.9:1, 5:1, 6:1, 7:1, 8:1, 9:1, 10:1, 11:1, 12:1, 13:1, 14:1, 15:1 or more) and no greater than (i.e., less than or equal to) 20:1 (e.g., 20:1 or less, 19:1 or less, 18:1 or less, 17:1 or less, 16:1 or less, 15:1 or less).

Vulcanizing Agent

As discussed above, the cured rubber compositions of the first and third embodiments comprise at least one vulcanizing agent in an amount of at least 10 phr. In certain embodiments of the second embodiment, the cured rubber composition comprises at least one vulcanizing agent as part of the cure package; in certain such embodiments, the at least one vulcanizing agent is present in an amount of at least 10 phr. According to the first-third embodiments, one or more than one (e.g., two, three, or more) vulcanizing agents can be utilized in the rubber compositions, although generally only one vulcanizing agent will be utilized. When more than one vulcanizing agent is used, the amounts specified herein refer to the total amount of all vulcanizing agents used, unless otherwise specified. In certain embodiments of the first-third embodiments, the amount of the at least one vulcanizing agent is greater than 10 phr (e.g., 10.1, 10.2, 10.3, 10.4, 10.5, 11, 12, 13, 14, 15, 16, 17, 18, 19, 20 phr or more). In certain embodiments of the first-third embodiments, the amount of the at least one vulcanizing agent is no more than 25 phr or no more than 20 phr.

Examples of suitable types of vulcanizing agents that can used in the cured rubber compositions according to certain embodiments of the first-third embodiments, include but are not limited to, sulfur or peroxide-based curing components. Thus, in certain such embodiments, the curative component includes a sulfur-based curative or a peroxide-based curative. In certain embodiments of the first-third embodiments, the at least one vulcanizing agent comprises a sulfur-based curative. In certain embodiments of the first-third embodiments, the at least one vulcanizing agent consists of a sulfur-based curative (i.e., one or more sulfur-based curatives); in such embodiments, no other vulcanizing agent is utilized (i.e., a sulfur-based curative is the only vulcanizing agent). Examples of specific suitable sulfur vulcanizing agents include "rubbermaker's" soluble sulfur; sulfur donating curing agents, such as an amine disulfide, polymeric polysulfide, or sulfur olefin adducts; powdered sulfur; precipitated sulfur; highly dispersible sulfur; colloidal sulfur; insoluble sulfur; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference.

Vulcanizing Accelerator

As discussed above, the cured rubber compositions of the first and third embodiments comprise at least one vulcanizing accelerator. In certain embodiments of the second embodiment, the cured rubber composition comprises at least one vulcanizing accelerator as part of the cure package. According to the first-third embodiments, one or more than one (e.g., two, three, or more) vulcanizing accelerators can be used in the cured rubber compositions. Vulcanizing accelerators are used to control the time and/or temperature required for vulcanization (or curing) and to improve properties of the resulting composition. According to the first-third embodiments disclosed herein, the type and amount of vulcanizing accelerator(s) used in the cured rubber compositions may vary.

In certain embodiments of the first-third embodiments disclosed herein, the at least one vulcanizing accelerator is selected from at least one of the following classes of vulcanizing accelerators: thiurams, thioureas, dithiocarbamates, xanthates, or thiophosphates. In certain embodiments of the first-third embodiments, the at least one vulcanizing accelerator comprises a thiazole, optionally in combination with one of more vulcanizing accelerators from one or more of the foregoing classes. Non-limiting examples of vulcanizing accelerators that belong to the class of thiurams include: TMTM (tetramethyl thiuram monosulfide), TMTD (tetramethyl thiuram disulfide), DPTT (dipentamethylene thiuram tetrasulfide), TETD (tetraethyl thiuram disulfide), TiBTD (tetraisobutyl thiuram disulfide), and TBzTD (tetrabenzyl thiuram disulfide). Non-limiting examples of vulcanizing accelerators that belong to the class of thioureas include: ETU (ethylene thiourea), DPTU (N,N-diethyl thiourea), DETU (N,N-dibutylthiourea), and DBTU (diphenyl thiourea). Non-limiting examples of vulcanizing accelerators that belong to the class of dithiocarbamates include: ZDMC (zinc dimethyl dithiocarbamate), ZDEC (zinc diethyl dithiocarbamate), ZDBC (zinc dibutyl dithiocarbamate), ZEDC (zinc N-ethyl-dithiocarbamate), CDMC (copper dimethyl dithiocarbamate) and ZBEC (zinc dibenzyl dithiocarbamate). Non-limiting examples of vulcanizing accelerators that belong to the class of xanthates include: ZIX (zinc isopropyl xanthate). Non-limiting examples of vulcanizing accelerators that belong to the class of thiophosphates include: ZBDP (Zinc-O,O-di-N-phosphorodithioate). Non-limiting examples of vulcanizing accelerators that belong to the class of thiazoles include: MBT (2-mercaptobenzothiazole), MBTS (2,2-benzothiazole disulfide), ZMBT (zinc 2-mercaptobenzothiazole) and CMBT (copper 2-mercaptobenzothiazole). Additional examples of suitable vulcanizing accelerators for use in certain embodiments of the first-third embodiments disclosed herein include, but are not limited to, sulfenamides (e.g., N-cyclohexyl-2-benzothiazole-sulfenamide (CBS), N,N-dicyclohexyl-2-benzothiazole-sulfenamide (DCBS), N-tert-butyl-2-benzothiazole-sulfenamide (TBBS), and the like); guanidine vulcanizing accelerators (e.g., diphenyl guanidine (DPG) and the like); and carbamate vulcanizing accelerators (e.g., zinc dibutyl dithocarbamate (ZDBC), zinc dibenzyl dithiocarbamate (ZBEC), zinc diethyl dithiocarbamate (ZDEC), zinc dimethyl dithiocarbamate (ZDMC), zinc N-ethyl-dithiocarbamate (ZEDC), copper dimethyl diothiocarbmate (CDMC), and the like), and combinations thereof; such vulcanizing accelerators can be used either alone, in combination, or in combination with one or more of the foregoing classes of vulcanizing accelerators (e.g., thiurams, thioureas, dithiocarbamates, xanthates, or thiophosphates). In certain embodiments of the first-third embodiments, the at least one vulcanizing accelerator is selected from at least one of the following classes of vulcanizing accelerators: sulfenamides, guanidines, or carbamates. In certain embodiments of the first-third embodiments, the at least one vulcanizing accelerator is selected from at least one of the following classes of vulcanizing accelerators: thiazoles, sulfenamides, or guanidines. In certain embodiments of the first-third embodiments the total amount of vulcanizing accelerator used in the cured rubber composition ranges from 0.5 to 15 phr (e.g., 0.5, 0.7, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15 phr), 0.5 to 10 phr, 0.5 to 5 phr, 1 to 10 phr, or 1 to 5 phr.

Vulcanization Activator

In certain embodiments of the first-third embodiments, the cured rubber composition comprises at least one vulcanization activator as part of the cure package. According to the first-third embodiments, one or more than one (e.g., two, three, or more) vulcanization activator can be used in the rubber compositions.

Vulcanization activators are additives that can be used to support vulcanization. According to embodiments of the first-third embodiments, vulcanization activators will generally include both an inorganic and organic component. Zinc oxide is the most widely used inorganic vulcanization activator. Various organic vulcanization activators are commonly used including stearic acid, palmitic acid, lauric acid, and zinc salts of each of the foregoing. In certain embodiments of the first-third embodiments, the total amount of vulcanization activator used ranges from 0.5 to 20 phr, 1 to 20 phr, 5 to 20 phr, 0.5 to 15 phr, 1 to 15 phr, or 5 to 15 phr. In certain embodiments of the first-third embodiments, the vulcanization activator comprises zinc oxide in an amount of 1 to 15 phr, 2 to 15 phr, or 5 to 12 phr. In certain embodiments of the first-third embodiments, the vulcanization accelerator comprises stearic acid in an amount of 0.1 to 6 phr, 0.5 to 5 phr, or 1 to 4 phr. In certain embodiments of the first-third embodiments, the vulcanization activator comprises both zinc oxide and stearic acid (each in one of the foregoing respective amounts and/or in a total amount of one of the foregoing total amounts).

Vulcanization Inhibitor

In certain embodiments of the first-third embodiments, the cured rubber composition comprises at least one vulcanization inhibitor as part of the cure package. In certain embodiments of the first-third embodiments, the cured rubber composition comprises no (i.e., 0 phr) of vulcanization inhibitor. Vulcanization inhibitors that can be used to control the vulcanization process and generally retard or inhibit vulcanization until the desired time and/or temperature is reached. In certain embodiments of the first-third embodiments, the vulcanization inhibitor includes PVI (cyclohexylthiophthalmide) from Santogard. In certain embodiments of the first-third embodiments, the amount of vulcanization inhibitor used in the cured rubber compositions is 0.1 to 3 phr, preferably 0.5 to 2 phr.

Anti-Reversion Agent

As discussed above, according to the first embodiment, the cured rubber composition optionally comprises at least one anti-reversion agent. In certain embodiments of the second and third embodiments, the cured rubber composition optionally comprises at least one anti-reversion agent. In certain embodiments of the first-third embodiments, the rubber composition comprises at least one anti-reversion agent; one or more than one anti-reversion agent may be utilized. In certain embodiments of the first-third embodiments, the rubber contains no (i.e., 0 phr) anti-reversion agent. An anti-reversion agent functions to reduce the amount of reversion that can be experienced by certain rubber compositions after curing; reversion is a phenomenon whereby sulfur crosslinks are rearranged (and may be lost) during curing, during strain cycling, or during heat treatment. Various anti-reversion agents are well-known to those of skill in the art. In those embodiments of the first-third embodiments wherein the rubber composition comprises 51 phr or more of natural rubber, it may be especially beneficial to include at least one anti-reversion agent in the rubber composition.

In certain embodiments of the first-third embodiments, the rubber composition comprises at least one anti-reversion agent selected from at least one of the following: (1) bis-(3-triethoxysilylpropyl)-tetrasulfide (optionally in combination with a thiazole vulcanizing accelerator, sulphenamide vulcanizing accelerator, or a combination thereof); (2) sodium hexamethylene bis-thiosulphate; (3) mono- or di-sulphenamides of pentachlorothiophenol; (4) dithiophosphates, including zinc salts thereof (optionally in combination with a sulphenamide vulcanizing accelerator); (5) zinc salts of aliphatic and/or aromatic carboxylic acids (e.g., C8-C10); (6) imide compounds; or (7) acrylate esters. Exemplary imide compounds include N,N-m-phenylenedimaleimide and bis-citraconimido compounds such as 1,3-bis(citraconimidomethyl)benzene. Exemplary acrylate esters include multi-functional acrylate esters such as Cray Valley® SR534 and SR534D available from TOTAL Cray Valley (Exton, Pa.).

In those embodiments of the first-third embodiments wherein the rubber composition includes at least one anti-reversion agent, the amount used may vary. In certain embodiments of the first-third embodiments, the rubber composition comprises 0.1 to 10 phr of at least one anti-reversion agent, 0.1 to 8 phr, 0.1 to 6 phr, 0.5 to 10 phr, 0.5 to 8 phr, or 0.5 to 6 phr. In those embodiments of the first-third embodiments where the rubber composition includes more than one anti-reversion agent, the foregoing amounts should be understood to refer to the total amount of all anti-reversion agents.

Other Ingredients

In certain embodiments of the first-third embodiments, the cured rubber composition comprises one or more additional ingredients, i.e., in addition to the elastomer(s), filler(s) and cure package ingredients, as discussed above. Various other ingredients that may optionally be added to the rubber compositions of the first-third embodiments disclosed herein are well known to those of skill in the art and include oils (processing, extender, or both), waxes, processing aids, antioxidants, antidegradants, rosins, carbon black coupling agents, tackifying resins, adhesion promoters, and peptizers.

Adhesion Promoter

In certain embodiments of the first-third embodiments, the cured rubber composition comprises at least one adhesion promoter. The adhesion promoter can increase the adhesion of the cured rubber composition to metal and is used herein to refer to compounds which will provide such an increased adhesion when used in a component that is in contact with metal (e.g., metal cords). It should be understood that the embodiment disclosed herein (e.g., relating to the used of the rubber component in a tire bead filler) will not necessarily be in contact with any metal. Certain adhesion promoters may also participate in the cross-linking of the cured rubber composition, thereby increasing the cross-link density thereof. Various adhesion promoters are well known to those of skill in the art and can be utilized in those embodiments of the first-third embodiments wherein the cured rubber composition comprises at least one adhesion promoter.

In certain embodiments of the first-third embodiments, the at least one adhesion promoter is selected from at least one of: (a) elemental cobalt or salts of bivalent cobalt comprising organic cobalt salts, inorganic cobalt salts, and combinations thereof; (b) organometallic complexes based on boron and cobalt, the latter being linked together through oxygen; or (c) a methylene donor-methylene acceptor system.

In certain embodiments of the first-third embodiments disclosed herein, the cured rubber composition comprises (includes) an adhesion promoter selected from (a). Various adhesion promoters in the form of salts of bivalent cobalt comprising organic cobalt salts and inorganic cobalt salts are known to those of skill in the art. Exemplary inorganic cobalt salts include cobalt chloride, cobalt sulfate, cobalt nitrate, cobalt phosphate, cobalt chromate, and combinations thereof. Exemplary organic cobalt salts include cobalt naphthenate, cobalt stearate, cobalt neodecanoate, cobalt rosinate, cobalt resinate, cobalt versatate, tall oil fatty acid cobalt salt and the like. In certain embodiments of the first-third embodiments, an organic cobalt salt having the formula $(R-CO-O)_2Co$, wherein R is a C6-C24 aliphatic or aromatic group is used as adhesion promoter. In certain embodiments of the first-third embodiments disclosed herein, the adhesion promoter selected from (a) comprises at least one of the foregoing types of bivalent cobalt salts. In certain embodiments of the first-third embodiments, the total amount of cobalt-containing adhesion promoter is 0.03-3 phr, 0.03-2 phr, 0.03-1 phr, 0.1-3 phr, 0.1-2 phr, 0.1-1 phr, 0.5-3 phr, 0.5-2 phr, or 0.5-1 phr.

In certain embodiments of the first-third embodiments disclosed herein, the cured rubber composition comprises (includes) an adhesion promoter selected from (b). Various adhesion promoters in the form of organometallic complexes based on boron and cobalt, the latter being linked together through oxygen are known to those of skill in the art. One such compound is the complex available under the tradename of Manobond® 680C from OM Group (Cleveland, Ohio). In certain embodiments of the first-third embodiments, the total amount of adhesion promoter (b) is 0.03-3 phr, 0.03-2 phr, 0.03-1 phr, 0.1-3 phr, 0.1-2 phr, 0.1-1 phr, 0.5-3 phr, 0.5-2 phr, or 0.5-1 phr.

In certain embodiments of the first-third embodiments disclosed herein, the cured rubber composition comprises (includes) an adhesion promoter selected from (c), i.e., an adhesion promoter in the form of at least one methylene donor and at least one methylene acceptor. In certain such embodiments, the at least methylene donor is present in an amount of 0.1-10 phr, 0.1-8 phr, or 0.1-5 phr and the at least methylene acceptor is present in an amount of 0.1-10 phr, 0.1-8 phr, or 0.1-5 phr. In certain such embodiments, the amount of methylene donor is greater than the amount of methylene acceptor, such as in a ratio of 1.2/1 to 1.8/1.

The term "methylene acceptor" is known to those having skill in such art and is used to describe the reactant(s), or compound(s) with which the methylene donor compound (described below) reacts to form what is believed to be an intermediate methylol monomer. It is envisioned that a condensation of the intermediate methylol monomer by formation of a methylene bridge produces a resin material. The initial reactant for which it is envisioned contributes the moiety that later forms the methylene bridge and ultimately the resin is referred to as the methylene donor and the other reactant is referred to as the methylene acceptor. Examples of suitable methylene acceptors include, but are not limited to, those disclosed in U.S. Pat. Nos. 6,605,670, 6,472,457, 5,945,500, 5,936,056, 5,688,871, 5,665,799, 5,504,127, 5,405,897, 5,244,725, 5,206,389, 5,194,513, 5,030,692, 4,889,481, 4,605,696, 4,436,853 and 4,092,455, each of which is incorporated herein by reference in its entirety. Generically, examples of suitable methylene acceptor compounds for use in the cured rubber compositions of certain embodiments of the first-third embodiments include, but are not limited to, resorcinol, resorcinolic derivatives, monohydric phenols and derivatives thereof, dihydric phenols and derivatives thereof, polyhydric phenols and derivatives thereof, unmodified phenol novolak resins, modified phenol novolak resin, novolak resins, and mixtures thereof.

Suitable methylene donors are well-known to those of skill in the art. Examples of suitable methylene donor compounds for use in the cured rubber compositions of certain embodiments of the first-third embodiments include, but are not limited to, hexamethoxymethylmelamine, hexamethylenetetramine, methoxymethyl melamine, N,N'N"-trimethyl N,N'N"-trimethylolmelamine, hexamethylolmelamine, N,N'N"-dimethylolmelamine, N-methylolmelamine, N,N'-dimethylolmelamine, N,N'N"-tris(methoxymethyl) melamine, N,N'N"-tributyl-N,N'N"-trimethyloi-melamine, hexaethoxymethylmelamine, and mixtures thereof.

In certain embodiments of the first-third embodiment disclosed herein, the cured rubber composition is prepared by adding the methylene acceptor(s) in a different mixing stage than the methylene donor(s). For instance, the methylene acceptor(s) can be added in a non-productive mixing stage, and the methylene donor can be added in the productive or final mixing stage. In other embodiments of the first-third embodiments disclosed herein, the cured rubber composition is prepared by adding both the methylene acceptor(s) and methylene donor(s) in the productive or final mixing stage.

Oils

In certain embodiments of the first-third embodiments, the cured rubber composition comprises at least one oil. One or more than one oil may be used. The oil may be present as an extender oil (i.e., added as part of an oil-extended diene-based elastomer), as a process oil (i.e., added during compounding), or a combination of both. Various types of processing and extender oils may be utilized, including, but not limited to aromatic, naphthenic, and low PCA oils, as discussed above. Generally, for most applications the total amount of oil used (processing oil and any extender oil) in the rubber compositions disclosed herein ranges from about 1 to about 20 phr, including 1 to 20 phr, about 1 to about 15 phr, 1 to 15 phr, about 1 to about 10 phr, and 1 to 10 phr. In certain embodiments of the first-third embodiments, the cured rubber composition comprises no more than 10 phr, no more than 5 phr, no more than 3 phr, no more than 1 phr, or 0 phr of oil.

According to the first-third embodiments disclosed herein, when at least one oil is utilized, the particular type of oil used can vary. Generally, any oil utilized will be compatible with the elastomer(s) used (e.g., the at least one conjugated diene monomer-containing elastomer). In certain embodiments of the first-third embodiments, the oil comprises at least one of: a plant oil, a petroleum oil, or a combination thereof. Thus, one or more than one plant oil can be utilized; one or more than one petroleum oil can be utilized; one plant oil and more than one petroleum oil can be utilized; or one petroleum oil and more than one plant oil can be utilized. Various types of petroleum oils may be suitable for use in certain embodiments of the first-third embodiments disclosed herein including aromatic, naphthenic, paraffinic, or low PCA petroleum oils. The phrase "low PCA" refers to those oils having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15 and FLEXON 683 from EXXONMOBLE, VIVATEC 200 from BP, PLAXOLENE MS from TOTALFINAELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Plant oils, as discussed below, will also generally qualify as low PCA. Suitable plant oils for use in certain embodiments of the first-third embodiments disclosed herein include those that can be harvested from vegetables, nuts, and seeds. Non-limiting examples of suitable plant oils for use in certain embodiments of the first-third embodiments disclosed herein include, but are not limited to, soy or soybean oil, sunflower oil, safflower oil, corn oil, peanut oil, olive oil, grape seed oil, hazelnut oil, rice oil, safflower oil, sesame oil, mustard oil, flax oil, linseed oil, cotton seed oil, rapeseed oil, cashew oil, sesame oil, *camellia* oil, jojoba oil, macadamia nut oil, coconut oil, palm kernel oil, and palm oil. In certain embodiments of the first-third embodiments disclosed herein, the oil comprises a combination of plant oils such as more than one of the foregoing plant oils; such a combination of plant oils is sometimes called a vegetable oil. In certain embodiments of the first-third embodiments disclosed herein, the oil comprises (includes) soybean oil. In certain embodiments of the first-third embodiments disclosed herein, the oil comprises (includes) sunflower oil; in certain such embodiments, the sunflower oil comprises high-oleic sunflower oil (e.g., having an oleic acid content of at least 60%, at least 70%, or at least 80% by weight oleic acid).

Method for Increasing the Dielectric Constant

As discussed above, the second embodiment disclosed herein is directed to a method for increasing the dielectric constant of a cured rubber composition tire component. The method comprises providing a rubber composition having an increased crosslink density (as compared to a control composition) and a dielectric constant of at least 20. According to the second embodiment, the control composition comprises the same ingredients as the inventive rubber composition except for containing a reduced amount of sulfur (1.5 phr). By referring to a cured rubber composition tire component is meant a tire component that is comprised of a cured rubber composition. In certain embodiments of the second embodiment, the tire component comprises or is a bead filler. In other words, in certain embodiments of the second embodiment, the cured rubber composition is incorporated into a tire bead filler.

The particular ingredients used in preparing the cured rubber composition tire component of the second embodiment may vary. In certain embodiments of the second embodiment, the cured rubber composition tire component has the same composition as the cured rubber composition of the first embodiment.

In certain embodiments of the second embodiment, the cured rubber composition of the tire component comprises 100 phr of at least one conjugated diene monomer-based elastomer. In certain such embodiments, the 100 phr of at least one conjugated diene monomer-based elastomer has a composition as discussed above in the section entitled "Conjugated Diene Monomer-Containing Elastomer."

In certain embodiments of the second embodiment, the cured rubber composition of the tire component comprises filler comprising at least 25 phr of reinforcing carbon black.

In certain such embodiments, the filler has a composition as discussed above in the section entitled "Fillers" and in addition to the at least 25 phr of reinforcing carbon black, may contain one or more additional reinforcing filler, one or more non-reinforcing fillers, or a combination thereof.

In certain embodiments of the second embodiment, the cured rubber composition of the tire component comprises a cure package comprising at least 10 phr of vulcanizing agent and at least one vulcanizing accelerator. In certain such embodiments, the cure package has a composition as discussed above in the section entitled "Cure Package." As a non-limiting example, in certain embodiments of the second embodiment, the vulcanizing agent of the cure package comprises sulfur. As a second non-limiting example, in certain embodiments of the second embodiment, the at least one vulcanizing agent of the cure package is present in an amount sufficient to provide a ratio of vulcanizing agent to vulcanizing accelerator of greater than 4:1. As a third non-limiting example, in certain embodiments of the second embodiment, the cured rubber composition of the tire component comprises a cure package comprising greater than 10 phr of vulcanizing agent.

In certain embodiments of the second embodiment, the cured rubber composition of the tire component comprises at least one adhesion promoter. In other embodiments of the second embodiment, the cured rubber composition of the tire component contains no (i.e., 0 phr) of adhesion promoter. In those embodiments of the second embodiment wherein the cured rubber composition comprises at least one adhesion promoter, the type and amount of any such compounds is as discussed above in the section entitled "Adhesion Promoter."

In certain embodiments of the second embodiment, the cured rubber composition of the tire component comprises at least one anti-reversion agent. In other embodiments of the second embodiment, the cured rubber composition of the tire component contains no (i.e., 0 phr) of anti-reversion agent. In those embodiments of the second embodiment wherein the cured rubber composition comprises at least one anti-reversion agent the type and amount of any such agents is as discussed above in the section entitled "Anti-Reversion Agent."

In certain embodiments of the second embodiment, the cured rubber composition of the tire component comprises a combination of one or more of the above. As a non-limiting example, in certain embodiments of the second embodiment, the rubber composition comprises: (a) 100 phr of at least one conjugated diene monomer-containing elastomer; (b) filler comprising at least 25 phr of reinforcing carbon black; (c) a cure package comprising (i) at least 10 phr of vulcanizing agent, and (ii) at least one vulcanizing accelerator, and (d) optionally at least one anti-reversion agent. As a second non-limiting example, in certain embodiments of the second embodiment, at least one of the following is met: (a) the vulcanizing agent (of the cure package) comprises sulfur; (b) the rubber composition is incorporated into a tire bead filler; (c) the at least one vulcanizing agent is present in an amount sufficient to provide a ratio of vulcanizing agent to vulcanizing accelerator of greater than 4:1; or (d) the cured rubber composition further comprises at least one adhesion promoter.

Dielectric Constant

As discussed above, according to the first-third embodiments, the dielectric constant of the cured rubber composition is at least 20 (e.g., 20, 25, 30, 35, 40, 45, 50, 55, 60, 65, 70, 75, 80, 85, 90 or more), as measured at 915 MHz. In certain embodiments of the first-third embodiments, the dielectric constant of the cured rubber composition is 20-100, 20-90, 20-80, 20-70, 20-60, 30-100, 30-90, 30-80, 30-70, 30-60, 40-100, 40-90, 40-80, 40-70, 40-60, 50-100, 50-90, 50-80, or 50-70, as measured at 915 MHz. The dielectric constants referred to herein can be measured upon a rubber composition that has only recently been cured or upon a rubber composition that has been cured and aged for some period of time (e.g., according to the aging procedure described in the Examples).

Bead Filler

As discussed above, the third embodiment disclosed herein is directed to a tire containing a bead filler comprising a cured rubber composition having an increased crosslink density (as compared to a control composition) and a dielectric constant of at least 20. According to the third embodiment, the control composition comprises the same ingredients as the inventive rubber composition except for containing a reduced amount of sulfur (1.5 phr). By referring to a bead filler comprising a cured rubber composition is meant that the bead filler component of the tire is comprised of the cured rubber composition. As those of skill in the art will appreciate, a finished tire (such as is ready for installation onto a vehicle) will contain various tire components (such as a bead filler) that have been cured. However, during production of the tire, various of the components are added to the tire in an uncured or only partially cured state and are fully cured as part of the tire by various methods such as in a tire curing machine or tire press.

As those of skill in the art will understand, pneumatic tires generally contain a bead portion which assists in holding the tire to the rim. The bead portion of the tire may comprise various configurations but generally includes at least a bead filler and a bead core. The bead filler is generally positioned on a radially outside periphery of (or radially above) the bead core. The bead core includes one or more wires or cords (often steel) in combination with hard rubber. Bead wires may be coated (such as with a bronze material) to increase adhesion with the surrounding rubber. A carcass ply of the tire may be turned up around or wound at least partially around the bead core.

The particular ingredients used in preparing the bead filler comprising a cured rubber composition of the third embodiment may vary. In certain embodiments of the third embodiment, the cured rubber composition of the bead filler has the same composition as the cured rubber composition of the first embodiment.

In certain embodiments of the third embodiment, the cured rubber composition of the bead filler comprises 100 phr of at least one conjugated diene monomer-based elastomer. In certain such embodiments, the 100 phr of at least one conjugated diene monomer-based elastomer has a composition as discussed above in the section entitled "Conjugated Diene Monomer-Containing Elastomer."

In certain embodiments of the third embodiment, the cured rubber composition of the bead filler comprises filler comprising at least 25 phr of reinforcing carbon black. In certain such embodiments, the filler has a composition as discussed above in the section entitled "Fillers" and in addition to the at least 25 phr of reinforcing carbon black, may contain one or more additional reinforcing filler, one or more non-reinforcing fillers, or a combination thereof.

In certain embodiments of the third embodiment, the cured rubber composition of the bead filler comprises a cure package comprising at least 10 phr of vulcanizing agent and at least one vulcanizing accelerator. In certain such embodiments, the cure package has a composition as discussed above in the section entitled "Cure Package." As a non-limiting example, in certain embodiments of the third embodiment, the vulcanizing agent of the cure package comprises sulfur. As a second non-limiting example, in certain embodiments of the third embodiment, the at least one vulcanizing agent of the cure package is present in an amount sufficient to provide a ratio of vulcanizing agent to vulcanizing accelerator of greater than 4:1. As a third non-limiting example, in certain embodiments of the third embodiment, the cured rubber composition of the bead filler comprises a cure package comprising greater than 10 phr of vulcanizing agent.

In certain embodiments of the third embodiment, the cured rubber composition of the bead filler comprises at least one adhesion promoter. In other embodiments of the third embodiment, the cured rubber composition of the bead filler contains no (i.e., 0 phr) of adhesion promoter. In those embodiments of the third embodiment wherein the cured rubber composition comprises at least one adhesion promoter, the type and amount of any such compounds is as discussed above in the section entitled "Adhesion Promoter."

In certain embodiments of the third embodiment, the cured rubber composition of the bead filler comprises at least one anti-reversion agent. In other embodiments of the third embodiment, the cured rubber composition of the bead filler contains no (i.e., 0 phr) of anti-reversion agent. In those embodiments of the third embodiment wherein the cured rubber composition comprises at least one anti-reversion agent, the type and amount of any such agents is as discussed above in the section entitled "Anti-Reversion Agent."

In certain embodiments of the third embodiment, the cured rubber composition of the bead filler comprises a combination of one or more of the above. As a non-limiting example, in certain embodiments of the third embodiment, the rubber composition comprises: (a) 100 phr of at least one conjugated diene monomer-containing elastomer; (b) filler comprising at least 25 phr of reinforcing carbon black; (c) a cure package comprising (i) at least 10 phr of vulcanizing agent, and (ii) at least one vulcanizing accelerator, and (d) optionally at least one anti-reversion agent. As a second non-limiting example, in certain embodiments of the third embodiment, at least one of the following is met: (a) the vulcanizing agent (of the cure package) comprises sulfur; (b) the cure package comprises more than 10 phr of vulcanizing agent; (c) the at least one vulcanizing agent is present in an amount sufficient to provide a ratio of vulcanizing agent to vulcanizing accelerator of greater than 4:1; or (d) the cured rubber composition further comprises at least one adhesion promoter.

Rubber Compositions for Non-Tire Applications

Also disclosed herein is a fourth embodiment comprising a cured rubber composition for non-tire applications. According to the fourth embodiment, the cured rubber composition has a dielectric constant of at least 20 (which should be understood to include all of the values and ranges as discussed generally amounts). In other words, the rubber composition of the fourth embodiment is not intended for use in a tire or as any tire component. Non-tire applications into which the cured rubber composition of the fourth embodiment can be incorporated (e.g., in order to improve the readability of a radio device contained therein) can vary widely and non-limiting examples include air springs, bladders, and other components for which tracking such as with an electronic communication module is advantageous or desired.

The composition of the cured rubber composition of the fourth embodiment may vary. In certain embodiments of the fourth embodiment, the cured rubber composition has the composition of the cured rubber composition as discussed above for the first-third embodiments, and the above sections and text concerning ingredients should be understood to apply to the cured rubber composition fourth embodiment even if not explicitly stated to apply. In certain embodiments of the fourth embodiment, the cured rubber composition comprises: (a) up to 100 phr of at least one conjugated diene monomer-containing elastomer (as discussed above). In those embodiments of the fourth embodiment wherein the total amount of conjugated diene monomer-containing elastomer is less than 100 phr or 100 parts, the remaining amount necessary to constitute 100 phr or 100 parts can be provided by one or more additional elastomers or rubbers; in certain such embodiments, the one or more additional elastomers or rubbers comprises at least one of acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, or tetrafluoroethylene-propylene rubber. Examples of fluorinated rubber include perfluoroelastomer rubber, fluoroelastomer, fluorosilicone, tetrafluoroethylene-propylene rubber, and combinations thereof.

In certain embodiments of the fourth embodiment, the cured rubber composition comprises at least one filler. In certain embodiments of the fourth embodiment, the cured rubber composition comprises at least one reinforcing filler (such as discussed above), in an amount of 5-200 phr or 5-100 phr. In certain embodiments of the fourth embodiment, the cured rubber composition comprises at least one non-reinforcing filler (such as discussed above), in an amount of 5-200 phr or 5-100 phr. In certain embodiments of the fourth embodiment, the cured rubber composition comprises at least one reinforcing filler in one of the foregoing amounts in combination with at least one non-reinforcing filler in one of the foregoing amounts.

In certain embodiments of the fourth embodiment, the cured rubber composition comprises a cure package comprising (i) at least 10 phr of vulcanizing agent (as discussed above), and (ii) at least one vulcanizing accelerator (as discussed above). In certain embodiments of the fourth embodiment, the cured rubber composition comprises a cure package having vulcanizing agent in the amount and type as discussed above, at least one vulcanizing accelerator in the amount and type as discussed above, and optionally at least one additional cure package ingredient (in an amount and type as discussed above).

In certain embodiments of the fourth embodiment, the cured rubber composition comprises at least one anti-reversion agent (as discussed above). In those embodiments of the fourth embodiment wherein the cured rubber composition includes at least one anti-reversion agent, the agent(s) may be utilized in an amount and type as discussed above.

Methods for Preparing Rubber Compositions

Rubber compositions (and their cured counterparts) for use in the first-third embodiments disclosed herein may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the first-third embodiments, one non-productive master-batch mixing stage may be used in preparing the rubber composition. In certain embodiments of the first-third embodiments, more than one (e.g., two, three, or more) non-productive master-batch mixing stage is used.

In certain embodiments of the first-third embodiments, the rubber composition is prepared by a process with the non-productive master batch mixing stage(s) conducted at a temperature of about 130° C. to about 200° C. In certain embodiments of the first-third embodiments, the rubber composition is prepared by a process with the final productive mixing stage conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

The cured form of the rubber composition according to the first-third embodiments (i.e., a cured rubber composition) may be prepared according to standard vulcanization processes. Generally, according to the first-third embodiments, vulcanization or curing of the rubber composition may take place at a temperature of 150-200° C., preferably 160-175° C. and/or for a time of 5-150 minutes (e.g., 5, 7, 10, 15, 20, 25, 30, 35, 40, 45, 50, 60, 70, 80, 90, 100, 110, 120, 130, 140, 150 minutes), preferably 5-120 or 5-140 minutes for car tires, light truck tires, and on-road heavier duty truck tires or for a time of 2 hours to 1 day or longer (e.g., 2 hours, 5 hours, 10 hours, 15 hours, 18 hours, 21 hours, 24 hours, 36 hours, 48 hours, 60 hours, 72 hours) for off-the-road tires (e.g., for mining equipment). According to the first-third embodiments, a tire bead filler may be at least partially cured prior to being added to a tire during production. As referred to herein, the cured rubber compositions of tire bead fillers are intended to encompass both partially cured and fully cured rubber compositions. In certain embodiments of the first-third embodiments, curing of the rubber composition (e.g., in the form of a tire bead filler) is completed in a tire mold or tire press.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular conjugated diene monomer-containing elastomer, the particular fillers, the contents of the cure package including the vulcanizing agent and vulcanizing accelerators used in the following examples and their respective amounts should not be interpreted as limiting since other such ingredients and amounts consistent with the disclosure in the Detailed Description can be utilized in substitution. In other words, the particular conjugated diene monomer-containing elastomer used to prepare the cured rubber composition, particular filler(s), and contents of the cure package including the vulcanizing agent and vulcanizing accelerator(s), and their relative amounts as used in the following examples should be understood to apply to the more general content of the Detailed Description.

EXAMPLES

Rubber compositions according to the formulas provided in Table 1 below were prepared where the amount of each ingredient is listed in phr. The rubber compositions contained varying amounts of sulfur as vulcanizing agent. Rubber compositions A-D can be considered controls since they contain less than 10 phr of sulfur vulcanizing agent. The mixing procedure set forth in Table 2 was utilized in preparing the rubber compositions.

TABLE 1

| Ingredient | A | B | C | D | E | F | G |
|---|---|---|---|---|---|---|---|
| Masterbatch Stage 1 | | | | | | | |
| Natural rubber | 100 | 100 | 100 | 100 | 100 | 100 | 100 |
| Carbon black (N330) | 50 | 50 | 50 | 50 | 50 | 50 | 50 |
| Silica | 0 | 0 | 0 | 0 | 0 | 0 | 0 |
| Silica coupling agent | 0 | 0 | 0 | 0 | 0 | 0 | 0 |
| Organic cobalt salt | 0.85 | 0.85 | 0.85 | 0.85 | 0.85 | 0.85 | 0.85 |
| Vulcanization activator 1 | 2 | 2 | 2 | 2 | 2 | 2 | 2 |
| Vulcanization activator 2 | 4.5 | 4.5 | 4.5 | 4.5 | 4.5 | 4.5 | 4.5 |
| Hydrocarbon resin | 2 | 2 | 2 | 2 | 2 | 2 | 2 |
| Processing aid | 4 | 4 | 4 | 4 | 4 | 4 | 4 |
| Masterbatch Stage 2 | | | | | | | |
| Carbon black (N990) | 35 | 35 | 35 | 35 | 35 | 35 | 35 |
| Carbon black (N330) Remill | 35 | 35 | 35 | 35 | 35 | 35 | 35 |
| Methylene donor-acceptor | 5 | 5 | 5 | 5 | 5 | 5 | 5 |
| Vulcanization activator 2 | 4.5 | 4.5 | 4.5 | 4.5 | 4.5 | 4.5 | 4.5 |
| Final mixing | | | | | | | |
| Sulfur | 1.5 | 6 | 7.5 | 9 | 11 | 13 | 16 |
| Methylene donor-acceptor | 5 | 5 | 5 | 5 | 5 | 5 | 5 |

TABLE 1-continued

| Ingredient | A | B | C | D | E | F | G |
|---|---|---|---|---|---|---|---|
| CBS[1] | 1 | 1 | 1 | 1 | 1 | 1 | 1 |
| MBTS[2] | 0.2 | 0.2 | 0.2 | 0.2 | 0.2 | 0.2 | 0.2 |
| Vulcanization activator 1 | 2 | 2 | 2 | 2 | 2 | 2 | 2 |
| Vulcanization inhibitor | 1.3 | 1.3 | 1.3 | 1.3 | 1.3 | 1.3 | 1.3 |

TABLE 2

Mixing Parameters

| Stage | Time | Condition |
|---|---|---|
| Masterbatch Stage 1 (initial temp: 80° C., rotor rpm started at 40) | 0 seconds<br>25 seconds | Charge polymers<br>Charge other master-batch stage 1 ingredients<br>Drop based on max temperature of 160° C. or 2 minutes mixing (whichever comes first) |
| Masterbatch Stage 2 (initial temp: 80° C., rotor rpm started at 40) | 0 seconds<br>25 seconds | Charge from masterbatch stage 1<br>Add additional carbon black<br>Drop based on max temperature of 160° C. or 2 minutes mixing (whichever comes first) |
| Remill Stage (initial temp: 80° C., rotor rpm at 40) | 0 seconds<br>25 seconds | Charge from masterbatch stage 2<br>Add remill ingredients<br>Drop based on max temperature of 160° C. or 2 minutes mixing (whichever comes first) |
| Final Batch Stage (initial temp: 80° C., rotor rpm at 40) | 0 seconds<br>0 seconds | Charge Remill<br>Charge curatives<br>Drop based on max temperature of 110° C. or 1.5 minutes mixing (whichever comes first) |

After compounding, each of the rubber compositions was calendered to a thickness of approximately 2 mm thickness. After calendaring, samples (measuring 30 mm×30 mm×2 mm) of each rubber composition in an uncured state were taken. The remaining uncured and calendered rubber compositions were then cured at 170° C. for 15 minutes. After curing, samples (measuring 30 mm×30 mm×2 mm) were taken of each cured rubber composition. One set of the cured samples was then subjected to an aging process whereby these samples were placed in an oven at 100° C. for 2 days.

The dielectric constant at 915 MHz was measured for each uncured, cured, and cured+aged rubber sample using a RF Impedance/Material Analyzer from Agilent Technologies (model E4991A with dielectric material test fixture 16453A). This analyzer utilizes the parallel plate method for measuring permittivity in accordance with ASTM method D150. Operating manuals, data sheets and other related information for measurement of permittivity using the E4991A RF Impedance/Material Analyzer are available with the instrument and also on-line at www.keysight.com, with Keysight Technologies now selling Agilent brand electronic measurement instrument). The dielectric constant values are reported in Table 3 below along with the respective thickness of each uncured, cured and cured+aged sample. The thickness of each sample was measured prior to determining its dielectric constant in order to account for minor variations resulting from calendaring as well as curing. It should be understood that the dielectric constants (i.e., relative permittivity) of rubber compositions according to the present disclosure can be measured using different instruments, although generally measurements taken using parallel plate methods in accordance with ASTM D150 are preferred.

TABLE 3

| Rubber Comp. | thickness (mm) | Uncured dielectric constant | thickness (mm) | Cured dielectric constant | thickness (mm) | Cured + aged dielectric constant |
|---|---|---|---|---|---|---|
| A | 2.48 | 13.3 | 2.22 | 23.4 | 2.31 | 34.8 |
| B | 2.27 | 13.8 | 2.25 | 30.4 | 2.12 | 43.3 |
| C | 2.20 | 12.3 | 2.22 | 45.2 | 2.04 | 43.1 |
| D | 2.15 | 9.2 | 2.15 | 50.3 | 2.13 | 56.1 |
| E | 2.07 | 12.6 | 2.18 | 45.5 | 2.08 | 52.3 |
| F | 2.15 | 11.7 | 2.18 | 49.6 | 2.15 | 62.6 |
| G | 2.17 | 11.8 | 2.18 | 43.3 | 2.04 | 58.4 |

As can be seen from the data of Table 3, overall, the dielectric constant can be said to generally increase with increasing amounts of sulfur vulcanizing agent. Additionally, the uncured samples of any particular rubber composition have a lower dielectric constant than their cured or cured+aged counterpart samples. The cured+aged samples for each of rubber compositions A and B, and D-G have a higher dielectric constant than their cured but unaged counterpart samples. The data of Table 3 indicates that the dielectric constant of a rubber composition can be increased (e.g., to at least 20, at least 30, at least 40, at least 50, or more) by increasing the amount of sulfur vulcanizing agent which results in an increase in crosslinking when the rubber composition is cured.

Samples from each of rubber compositions A-G are also measured for crosslink density. The crosslink density measurements are relative, with the sample of rubber composition A being used as the control. According to such measurements, each of the compositions B-G has higher crosslink density than control composition A and each of compositions E-G has a higher crosslink density than compositions B-D.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire containing a bead filler comprising a cured rubber composition and an electronic communication module including a radio device having at least a portion of its outer surface surrounded by a second rubber composition, wherein the cured rubber composition comprises:
    a. 100 phr of at least one conjugated diene monomer-containing elastomer,
    b. filler comprising at least 25 phr of reinforcing carbon black;
    c. a cure package comprising
        i. at least 10 phr of vulcanizing agent; and
        ii. at least one vulcanizing accelerator, and
    d. optionally at least one anti-reversion agent,
    wherein the cured rubber composition has a dielectric constant of at least 20.

2. The tire of claim 1, wherein the cure package comprises greater than 10 phr of vulcanizing agent.
3. The tire of claim 1, wherein the vulcanizing agent comprises sulfur.
4. The tire of claim 3, wherein the sulfur vulcanizing agent is present in an amount of 10-25 phr.
5. The tire of claim 3, wherein the at least one vulcanizing agent is present in an amount sufficient to provide a ratio of vulcanizing agent to vulcanizing accelerator of greater than 4:1.
6. The tire of claim 1, wherein the cured rubber composition further comprises at least one adhesion promoter.
7. The tire of claim 5, wherein the cured rubber composition further comprises at least one adhesion promoter.
8. The tire of claim 1, wherein the filler includes 50 to 150 of reinforcing carbon black and no more than 10 phr of silica filler.
9. The tire of claim 1, wherein the filler further comprises 10 to 100 phr of non-reinforcing carbon black.
10. The tire of claim 5, wherein the filler further comprises 10 to 100 phr of non-reinforcing carbon black and no more than 10 phr of silica filler.
11. The tire of claim 1, wherein the at least one conjugated diene monomer-containing elastomer is selected from the group consisting of styrene-butadiene rubber, polybutadiene rubber, styrene-isoprene rubber, styrene-butadiene isoprene rubber, natural rubber, polyisoprene, and combinations thereof.
12. The tire of claim 1, wherein the at least one conjugated diene monomer-containing elastomer is selected from the group consisting of styrene-butadiene rubber, polybutadiene rubber, natural rubber, polyisoprene, and combinations thereof.
13. The tire of claim 1, wherein at least 51 phr of the conjugated diene monomer-containing elastomer is selected from natural rubber, polyisoprene, and combinations thereof.
14. The tire of claim 1, wherein 70-100 phr of the at least one conjugated diene monomer-containing elastomer is natural rubber.
15. The tire of claim 5, wherein at least 51 phr of the conjugated diene monomer-containing elastomer is selected from natural rubber, polyisoprene, and combinations thereof.
16. The tire of claim 5, wherein 70-100 phr of the at least one conjugated diene monomer-containing elastomer is natural rubber.
17. The tire of claim 9, wherein at least 51 phr of the conjugated diene monomer-containing elastomer is selected from natural rubber, polyisoprene, and combinations thereof.
18. The tire of claim 9, wherein 70-100 phr of the at least one conjugated diene monomer-containing elastomer is natural rubber.
19. The tire of claim 8, wherein 70-100 phr of the at least one conjugated diene monomer-containing elastomer is natural rubber.
20. A tire containing a bead filler comprising a cured rubber composition having an increased crosslink density (as compared to a control composition) and a dielectric constant of at least 20.

* * * * *